Patented June 24, 1930

1,766,412

UNITED STATES PATENT OFFICE

EDWARD A. TAYLOR, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE

PIGMENT HAVING INSECTICIDAL AND FUNGICIDAL PROPERTIES AND PROCESS OF MAKING SAME

No Drawing.     Application filed August 5, 1926. Serial No. 127,478.

The present invention relates to arsenical compositions possessing insecticidal and fungicidal properties, and more particularly to compositions possessing such properties wherein a compound imparting one of the properties before named is caused to be precipitated, or "laked," on particles of a material possessing the other property.

It is known that calcium arsenate is equally as effective in insecticidal properties as acid arsenite of copper, lead arsenate, copper aceto-arsenite (Paris green), and the like.

It is known also that compositions combining the characteristics of an insecticide and a fungicide may be prepared; for instance, by mixing copper phosphate, copper hydroxide, or dehydrated copper sulfate with calcium arsenate, with or without further addition of calcium oxide or calcium sulfate.

I have discovered that a combined insecticide and fungicide having definite commercial utility may be produced advantageously by "laking" a freshly precipitated compound, having the properties of one of the agents named above, upon freshly precipitated particles of a compound having the properties of the other agent. Thus, a fungicidal compound may be "laked" upon particles of an insecticide, or vice versa. The material upon which the second material is precipitated may be called the "substratum" and the material precipitated upon the "substratum" may be called the "superstratum."

As one example of this mode of preparation, I shall describe the preparation of a green pigment having both insecticidal and fungicidal properties, being especially efficacious as an insecticide and fungicide for dusting potatoes, tobacco, etc. This green pigment is produced by "laking" a freshly precipitated compound containing copper and chromium on freshly precipitated particles of calcium arsenate.

The manner in which I prefer to prepare the above pigment, although I contemplate using it in the above-described manner regardless of the method of preparation, consists in slaking about 385 parts by weight of calcium oxide containing about 90% CaO with sufficient water to give a thin slurry, separately preparing an aqueous solution of 495 parts by weight of arsenic acid ($As_2O_5$), in the form of a 25% solution, slowly running the hot milk of lime slurry and the arsenic acid solution coincidentally into an agitated vessel while maintaining the temperature at about 160° F., and finally adding, preferably simultaneously, to the resulting mixture separately prepared solutions of copper sulfate ($CuSO_4.5H_2O$) and sodium bichromate ($Na_2Cr_2O_7.2H_2O$), containing 88 and 13.5 parts by weight respectively.

It is essential that the milk of lime slurry be fed into the reaction vessel hot, and that the arsenic acid solution and the milk of lime slurry be added at the same time and substantially in the proper proportions so that at all times the reaction mixture is slightly alkaline.

The temperature of precipitation of the calcium arsenate is important in keeping the water-soluble arsenic content down to a reasonably low figure; at least below 2%.

The addition of the solutions of copper sulfate and of sodium bichromate may be effected while the first-prepared mixture is hot, or they may be added after cooling.

The probable mechanism of the reaction between the copper sulfate and the sodium bichromate may be explained as follows, it being understood that the invention is not limited thereto: copper hydrate is believed to be formed in an initial stage of the reaction, and, in the second stage a mixture comprising basic copper chromate and copper hydrate is produced; thus giving a green color. It may be possible that a certain amount of copper arsenate also is formed, and that a further reaction with the bichromate converts the former to the green salt which is actually obtained.

The resulting green pigment is separated from the liquid, as by filter pressing, and dried at a temperature below 125° C.

To improve or alter the shade of the green pigment there may be added to it, after drying, an aqueous or alcoholic solution of a suitable dyestuff. I have found that a dye solution containing about 80% alkali green 3GL and 20% metanil yellow, extra concentrated, and in amount equalling about four-tenths of one per-cent by weight of the finished product, added to the pigment will improve the shade of the latter. The dyestuff mixture above mentioned cannot be added to the slurry or to the wet filter cake before drying, because of the fact that the former discolors on heating in the presence of free lime. Therefore I prefer to add the dyestuff mixture, in the form of a solution or suspension in alcohol or water, to the dry, broken up, cake just before grinding, in order that the dyestuffs, containing some solvent, be the more evenly distributed over the particles of pigment. By this method a color lake having desirable tinctorial characteristics is produced.

The composition obtained by following the above procedure contains about 45–50% total arsenic as $As_2O_5$ and a water-soluble arsenic content of less than 1.8% as $As_2O_5$.

It is evident that changes may be made and other substances used according to the principles herein set out without departing from the spirit and purpose of my invention and it is intended that the particular substances and reactions herein described shall be considered as merely illustrative of the invention and not in a limiting sense except as may be required by the appended claims.

I claim:

1. The process of producing a pigment adapted for use as a fungicide and insecticide which comprises precipitating copper chromate as superstratum upon an insoluble arsenical insecticide in finely divided form as substratum.

2. The process of producing a pigment adapted for use as a fungicide and insecticide which comprises precipitating an insoluble salt of copper as superstratum upon calcium arsenate in finely divided form as substratum.

3. The process of producing a pigment adapted for use as a fungicde and insecticide which comprises precipitating copper chromate as superstratum upon calcium arsenate in finely divided form as substratum.

4. As an insecticide and fungicide a pigment comprising copper chromate precipitated as superstratum upon an insoluble arsenical insecticide in finely divided form as substratum.

5. As an insecticide and fungicide a pigment comprising an insoluble salt of copper precipitated as superstratum upon calcium arsenate in finely divided form as substratum.

6. As an insecticide and fungicide a pigment comprising copper chromate precipitated as superstratum upon calcium arsenate in finely divided form as substratum.

In testimony whereof, I affix my signature.

EDWARD A. TAYLOR.